United States Patent [19]

Kadono et al.

[11] 4,323,089

[45] Apr. 6, 1982

[54] HOSE END CONSTRUCTION

[75] Inventors: Mamoru Kadono; Tetsuji Saigusa, both of Yokohama, Japan

[73] Assignee: Bridgestone Tire Company Limited, Tokyo, Japan

[21] Appl. No.: 85,347

[22] Filed: Oct. 16, 1979

[30] Foreign Application Priority Data

Oct. 31, 1978 [JP] Japan ................................ 53-133160

[51] Int. Cl.³ .......................... F16L 11/12; F16L 9/00; F32B 31/00

[52] U.S. Cl. .................................... 138/109; 138/127; 138/139; 138/153; 138/174; 285/239; 285/249; 285/255

[58] Field of Search ............... 138/109, 126, 127, 138, 138/139, 153, 172, 174, DIG. 7; 285/239, 245, 247, 249, 255

[56] References Cited

U.S. PATENT DOCUMENTS 3,613,736 10/1971 Kuwabara ........................... 285/239
4,191,217 3/1980 Kadono et al. ...................... 138/109

FOREIGN PATENT DOCUMENTS 948643 7/1961 United Kingdom ................ 138/109

Primary Examiner—Steven L. Stephan
Attorney, Agent, or Firm—Sughrue, Mion, Zinn, Macpeak and Seas

[57] ABSTRACT

A hose end construction comprising a hose main body and a connection metal fitting secured to the end portion of said hose main body by means of a clamping ring and a ferrule circumferentially tightening the end portion of said hose main body to said connection metal fitting.

3 Claims, 3 Drawing Figures

FIG. 1
_PRIOR ART_
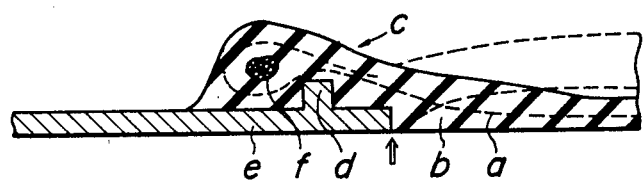

HOSE END CONSTRUCTION

BACKGROUND OF THE INVENTION

1. Field of the Invention

This invention relates to hose end constructions and more particularly to a hose end construction which can prevent fluid flowing through a hose from leaking between a hose main body of the hose subjected to a relatively high internal pressure and a connection metal fitting.

2. Description of the Prior Art

In a conventional hose end construction, heretofore, it has been the common practice to insert a nipple to constitute a connection metal fitting and provided at its outer periphery with a rib into the end portion of a hose main body comprising a reinforcing layer and a resilient rubber portion and the end portion of the reinforcing layer is wound around a bead wire located beyond the rib to form a turn-back portion. In such a conventional hose end construction, if the hose is inflated by applying the internal pressure therein, the resilient rubber portion of the hose main body becomes bulged. As a result, the resilient rubber portion becomes broken at that end surface of the nipple which is adjacent to the resilient rubber portion or the resilient rubber portion becomes separated from the nipple, thereby leaking the fluid to be transported.

SUMMARY OF THE INVENTION

An object of the invention, therefore, is to provide a hose end construction which can effectively eliminate the above mentioned drawback which has been encountered with the prior art techniques.

A feature of the invention is the provision in a hose end construction comprising a hose main body and a connection metal fitting secured to the end portion of the hose main body. The improvement comprises a hose main body composed of a resilient rubber portion, an annular bead located near the end surface of the hose main body and embedded in the resilient rubber portion and a reinforcing layer having an end portion wound around the annular bead to form a turn-back portion and embedded in the resilient rubber portion. A nipple constitutes the connection metal fitting and is provided at its outer periphery with a rib, the end surface of the end portion of the hose main body being urged against the rib. A clamping member circumferentially tightens the end portion of the hose main body to the nipple.

Further objects and features of the invention will be fully understood from the following detailed description with reference to the accompanying drawings, wherein:

BRIEF DESCRIPTION OF THE DRAWINGS

FIG. 1 is a partial sectional view of a conventional hose end construction;

DETAILED DESCRIPTION OF THE PREFERRED EMBODIMENTS

FIG. 1 shows a representative prior art conventional hose end construction. In such conventional hose end construction, heretofore, it has been the common practice to insert a nipple provided at its outer periphery with a rib d into the end portion of a hose main body composed of a reinforcing layer a and a resilient rubber portion b and the end portion of the reinforcing layer a is wound around a bead wire f located beyond the rib d from the inside toward the outside thereof to form a turn-back portion.

If such kind of hose is inflated by applying an internal pressure therein, the resilient rubber portion b of the hose main body c becomes bulged as shown by dotted lines in FIG. 1. As a result, at a boundary surface formed between the nipple e and the resilient rubber portion b and shown by an arrow in FIG. 1, there is a risk of the resilient rubber portion b being broken or being separated from the nipple e, thereby leaking the fluid flowing through the hose.

Figure 2:
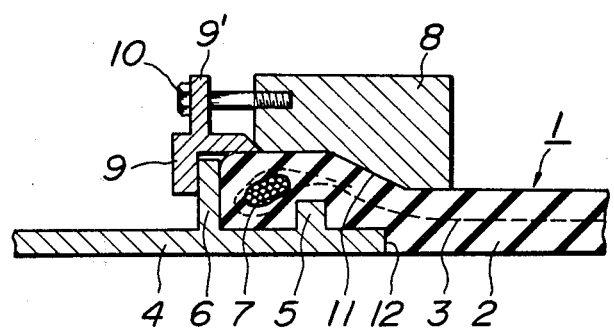
FIG. 2 is a partial sectional view of one embodiment of a hose end construction according to the invention.

FIG. 2 shows one embodiment of a hose end construction according to the invention. In FIG. 2, reference numeral 1 designates a hose main body composed of a resilient rubber portion 2 and a reinforcing layer 3 embedded in the resilient rubber portion 2. Element 4 is a nipple provided with a connection flange (not shown). The nipple 4 is provided at its outer periphery with a lower rib 5 and a higher rib 6 spaced from each other in the axial direction of the nipple 4.

In the present embodiment, the nipple 4 is inserted into the end portion of the hose main body 1 such that the end portion of the resilient rubber portion 2 is circumferentially tightened to a space formed between the lower and higher ribs 5, 6. The end portion of the reinforcing layer 3 is wound around a bead wire 7 located between the lower and higher ribs 5, 6 from the inside toward the outside thereof to form a turn-back portion.

A clamping member 8 is tightly fitted around that region of the outer periphery of the end portion of the hose main body 1 which extends from a portion opposed to the nipple 4 to a portion adjacent to the center portion of the hose main body 1. As a result, the clamping member 8 functions to tightly urge the end portion of the hose main body 1 against the outer periphery of the nipple 4.

In addition, an annular metal fitting 9 which is L-shaped in section and provided at its outer periphery with a projection 9' is brought into engagement with the higher rib 6 and the outer periphery of the end portion of the hose main body 1. The projections 9' of the annular metal fitting 9 are connected to the clamping member 8 by means of bolts 10.

The clamping member 8 is preferably provided at its inside center portion with a tapered surface 11 which is gradually diverged toward the end surface of the end portion of the hose main body 1 in conformity with the configuration of the outer periphery of the end portion of the hose main body 1. Alternatively, the tapered surface 11 may be replaced by a shoulder which is square in section. Such a tapered surface 11 or the shoulder of the clamping member 8 functions to effectively prevent the end portion of the hose main body 1 from being removed from the nipple 4 when the hose main body 1 is inflated by the internal pressure applied therein.

The use of the clamping member 8 for circumferentially tightening the end portion of the hose main body 1 to the nipple 4 and the bolt 10 for restraining the clamping member 8 and hence the end portion of the hose main body 1 to the nipple 4 ensures positive prevention of removal of the end portion of the hose main body 1 from the nipple 4. In addition, that end portion of the clamping member 8 which is located near the center portion of the hose main body 1 serves to circumferentially tighten the end portion of the hose main body 1 to the rib 5. As a result, the resilient rubber portion 2 is prevented from being bulged at a position near the nipple 4, thereby preventing a separation failure of the resilient rubber portion 2 from the end surface 12 of the nipple 4.

Figure 3:
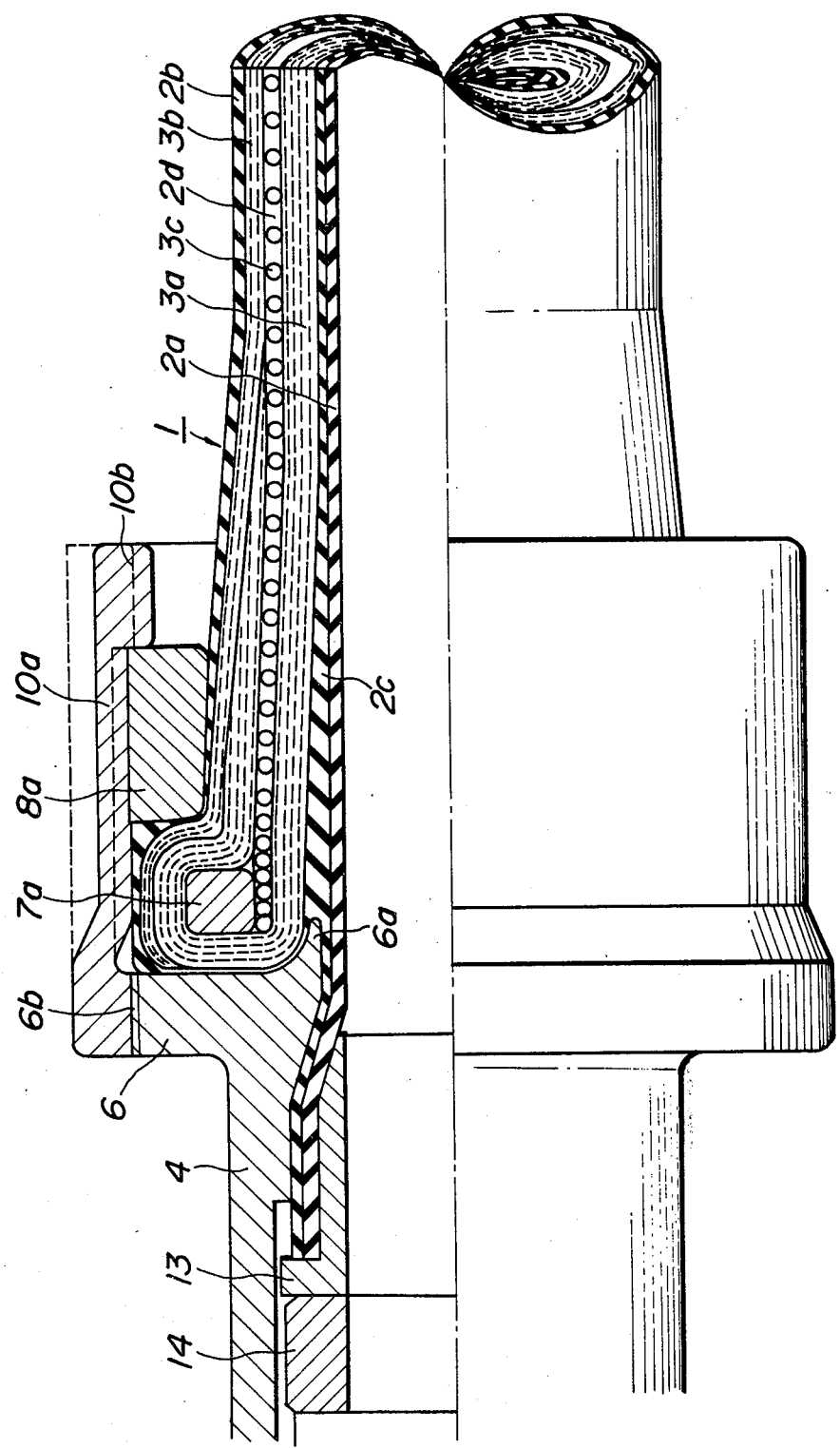
FIG. 3 is a detailed partial sectional view of another embodiment of a hose end construction according to the invention.

FIG. 3 shows another embodiment of a hose end construction according to the invention partly in section. In the present embodiment, a hose main body 1 is composed of a resilient rubber portion including an inner surface rubber 2a and an outer coating rubber 2b and reinforcing cords 3a, 3b embedded in the resilient rubber portion and a helically formed reinforcing wire 3c embedded in the resilient rubber portion. One end of the reinforcing cord 3a is wound around an annular ring 7a located at the end portion of the hose main body 1 from the inside toward the outside thereof so as to form a turn-back portion, while the reinforcing cord 3b is superimposed about the turn-back portion of the reinforcing cord 3a and about the helically formed reinforcing wire 3c disposed outside the reinforcing cord 3a.

In FIG. 3, reference numeral 2c designates a rubber layer for bonding the inner surface rubber 2a with the reinforcing cord 3a and 2d shows rubber filling up spaces formed between adjacent turns of the helically formed reinforcing wire 3c embedded therein.

The end surface of the end portion of the hose main body 1 constructed as above described is brought into contact with the rib 6 of the nipple 4. In the present embodiment, the rib 6 is provided at its inner periphery with an annular tongue 6a projected in the axial direction of the nipple 4. The annular tongue 6a functions to support the inner peripheral surface of the reinforcing cord 3a. The rubber layer 2c and the inner surface rubber 2a are extended along the inner peripheral surfaces of the nipple 4 and the rubber layer 2c serves to bond the inner surface rubber 2a with the nipple 4.

That portion of the outer surface of the hose main body 1 which is nearer to the center portion of the hose main body 1 than the annular ring 7a is circumferentially tightened by means of a clamping ring 8a. In addition, provision is made of a ferrule 10a having one end threadedly engaged with the outer periphery 6b of the rib 6 and another end forming a reduced diameter portion 10b and sliding engaged with the clamping ring 8a. The ferrule 10a is deformed from a dotted lines position to a full line position by a die having a frustoconical-shaped inner surface configuration. As a result, the ferrule 10a functions to circumferentially tighten the hose main body 1 to the outside of the annular ring 7a and also functions to prevent the clamping ring 8a from moving toward the center portion of the hose main body 1 by means of the diameter reduced portion 10b. In addition, since the ferrule 10a is threadedly engaged at its one end with the outer periphery of the rib 6 and circumferentially tightened to the end surface of the end portion of the hose main body 1, it is possible to closely adhere the end surface of the end portion of the hose main body 1 to the rib 6.

In FIG. 3, reference numeral 13 designates a stop ring located at the inside of the nipple 4 and supporting the end of the inner surface rubber 2a and 14 shows a thrust screw for pushing the stop ring 13 toward the center portion of the hose main body 1.

As stated hereinbefore, the hose end construction constructed as above described according to the invention has advantages that the hose main body 1 is positively prevented from being removed from the connection metal fitting such as the nipple 4 by means of the clamping ring 8a and the ferrule 10a, and that the hose main body 1 is prevented from bulging at a position near the nipple 4 when the hose main body 1 is inflated by the internal pressure applied therein due to the fluid flowing therethrough. As a result, the end surface of the end portion of the hose main body is prevented from being separated from the rib 6 and the resilient rubber portion is prevented from being broken, thereby transporting the fluid without leakage.

What is claimed is:

1. In a hose end construction comprising a hose main body and a connection metal fitting secured to the end portion of said hose main body, the improvement comprising a hose main body composed of a resilient rubber portion including an inner surface rubber, an annular bead located near the end surface of said hose main body and embedded in said resilient rubber portion and a reinforcing cord layer having an end portion wound around said annular bead to form a turn-back portion and embedded in said resilient rubber portion, a nipple constituting said connection metal fitting and provided at its outer periphery with a rib, the end surface of the end portion of said hose main body being urged against said rib while said turn-back portion being located inside an inner end of said nipple with respect to the axial direction of said hose main body and said inner surface rubber being extended along the inner peripheral surface of said nipple, and a clamping member composed of a clamping ring for circumferentially tightening that portion of the outer surface of said hose main body which is nearer to the center portion thereof than said annular bead to said nipple, and a ferrule having one end threadedly engaged with the outer periphery of said rib and another end forming a reduced diameter portion and slidably engaged with said clamping ring.

2. The hose end construction according to claim 1, wherein said hose main body is composed of a resilient rubber portion including an inner surface rubber and an outer coating rubber and reinforcing cords embedded in said resilient rubber portion and a helically formed reinforcing wire embedded in said resilient rubber portion, one end of one of said reinforcing cords being wound around an annular ring located at the end portion of said hose main body from the inside toward the outside thereof so as to form a turn-back, portion, while the other reinforcing cord being superimposed about said turn-back portion and about said helically formed reinforcing wire disposed outside one of said reinforcing cords.

3. The hose end construction according to claim 1, wherein said clamping member is provided at its inside center portion with a tapered surface gradually diverged toward the end surface of the end portion of said hose main body in conformity with the configuration of the outer periphery of the end portion of said hose main body.

* * * * *